United States Patent [19]
Buccino

[11] 3,883,116
[45] May 13, 1975

[54] SPRING CLAMP TOOL FOR SERVICING SHOCK ABSORBERS

[76] Inventor: Jerry M. Buccino, 2034 Pelham Ave., Los Angeles, Calif. 90025

[22] Filed: Sept. 16, 1974

[21] Appl. No.: 506,529

[52] U.S. Cl. .............................................. 254/10.5
[51] Int. Cl. .............................................. B60p 1/00
[58] Field of Search ............................ 29/215–219, 29/225, 227, 256, 257; 254/10.5

[56] References Cited
UNITED STATES PATENTS

| | | | |
|---|---|---|---|
| 1,026,837 | 5/1912 | Titus | 29/215 |
| 1,587,689 | 6/1926 | Weiss et al. | 29/256 |
| 3,087,706 | 4/1963 | Van Der Wilt | 254/10.5 |

Primary Examiner—Othell M. Simpson
Attorney, Agent, or Firm—Ralph B. Pastoriza

[57] ABSTRACT

A special clamp tool is designed to be secured to the casing surrounding the lower portion of a shock absorber and includes first and second rods extending upwardly exterior of the coiled spring normally surrounding the shock absorber. These rods hook over diametrically opposite sides of the coiled spring and by threading suitable nuts on the lower portions of the rods against the underside of the clamp, the spring can be retracted, thereby relieving pressure and permitting the shock absorber to be uncoupled from the automobile frame and removed from the coiled spring and casing for servicing. The arrangement is such that shock absorbers can easily be serviced without having to disassemble other components on the vehicle.

1 Claim, 5 Drawing Figures

PATENTED MAY 13 1975　　　3,883,116
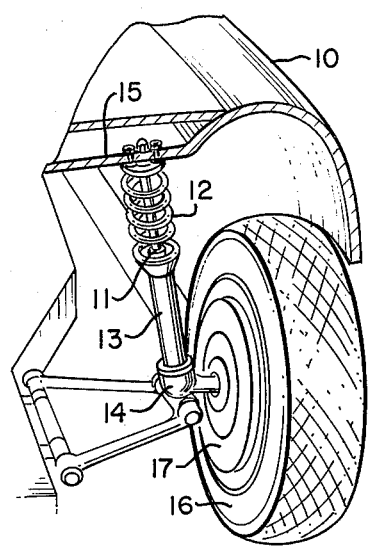
FIG.1
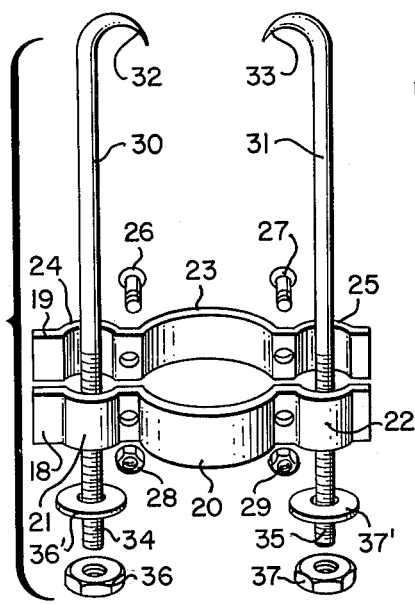
FIG.2
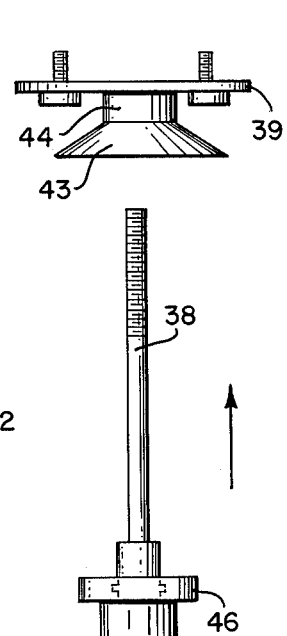
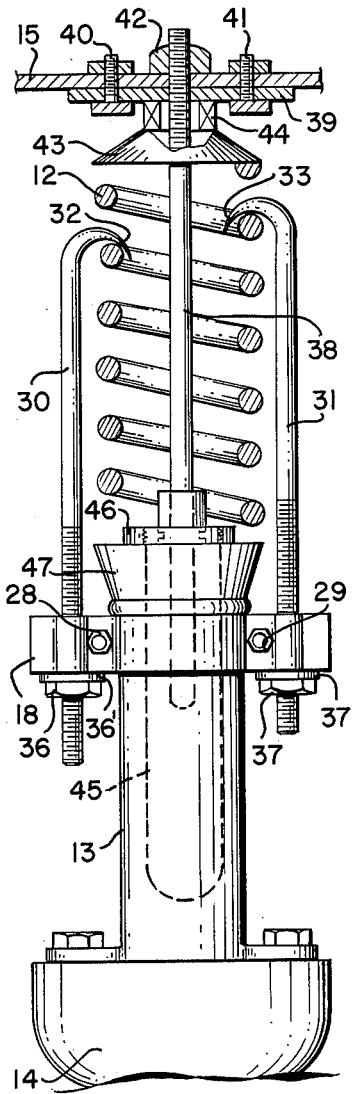
FIG.3
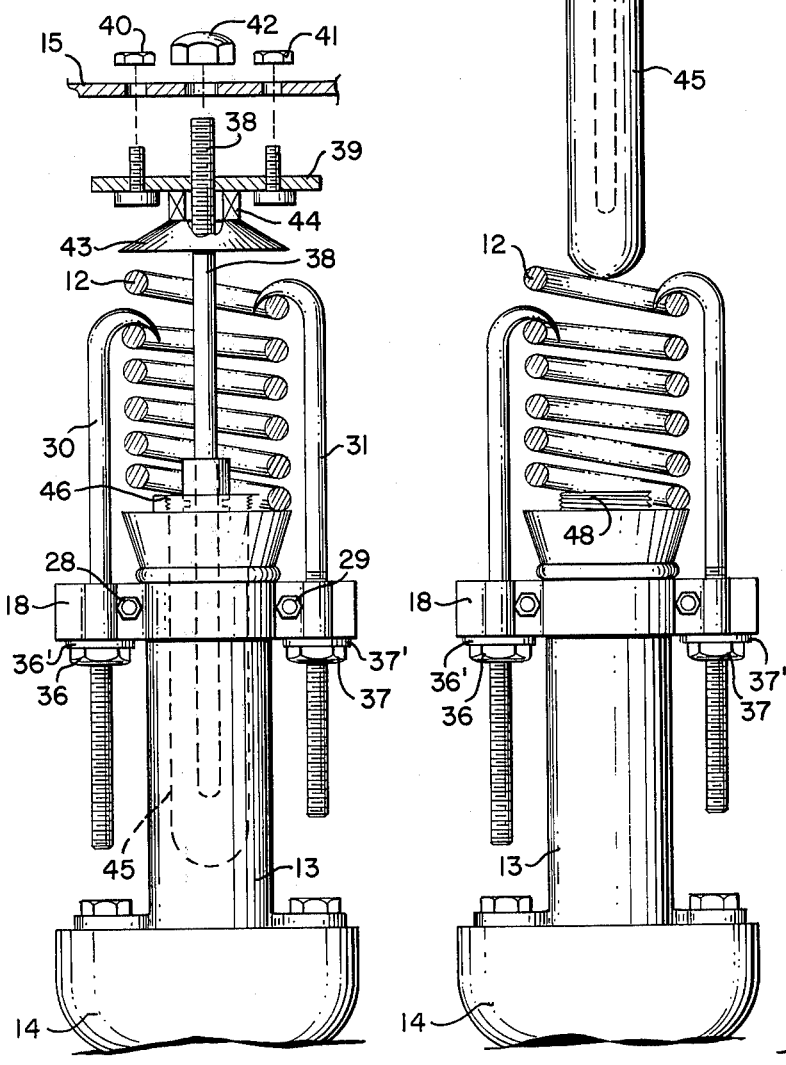
FIG.4　　FIG.5

SPRING CLAMP TOOL FOR SERVICING SHOCK ABSORBERS

This invention relates generally to tools, and more particularly to an improved spring clamp tool for use in servicing shock absorbers on automobiles.

BACKGROUND OF THE INVENTION

Conventional servicing of automobile shock absorbers involves removal of the casing portion normally secured to the ball joint inside the vehicle wheel, certain components of the wheel itself, the coiled spring disposed between the upper end of the casing and the underside of an upper portion of the vehicle frame, and numerous other components. The entire assembly is moved to a workbench. At the workbench, a special fixture or tool is provided enabling retraction of the coiled spring in order that the shock absorber may be removed from within the spring and casing. The shock absorber may then be repaired or replaced and the entire assembly is then moved from the workbench and repositioned on the vehicle.

The foregoing operation is extremely time consuming and as a consequence is relatively expensive. It would be very advantageous if there were some means of removing the shock absorbing unit itself from the vehicle without having to disassemble various other components. However, such an operation involves contracting the main coiled spring surrounding the shock absorber and as stated, this operation can normally only be carried out at a workbench.

BRIEF DESCRIPTION OF THE PRESENT INVENTION

With the foregoing in mind, the present invention contemplates a unique spring clamp tool particularly designed such that it may be secured to the casing portion supporting the shock absorber and operated to retract the coiled spring surrounding the shock absorber so that the shock absorber itself may be readily removed and replaced without the necessity of removing the casing, coiled spring itself, portions of the disc brake assembly, tubing and the like.

In accord with the invention, the clamp tool includes first and second clamp members each in the form of a bar shaped to define a central semi-circular portion and outer smaller semi-circular portions on either side of the central portion. Bolt and nut means are provided for securing the bars together in opposed relationship with the central portion positioned about the casing for the shock absorber so that the members are clamped to the casing. First and second elongated rods are then passed through the openings on either side of the casing to extend upwardly exterior of the coiled spring, the upper ends of the rods terminating in hooks for engaging the spring at diametrically opposite sides.

The lower portions of the rods extend through the openings defined by the smaller semi-circular portions of the clamp members and are threaded. Nuts are then tightened on the threads at the lower ends of the rods at the openings and retract the rods through the openings and retract the coil spring. The shock absorber may then be uncoupled from the upper frame portion of the vehicle body and from the casing for removal and replacement without having to disassemble the casing and spring from the vehicle.

BRIEF DESCRIPTION OF THE DRAWINGS

A better understanding of the invention will be had by now referring to the accompanying drawings in which:

FIG. 1 is a fragmentary perspective view of a portion of an automobile illustrating the normal position of a shock absorber and associated components;

FIG. 2 is an exploded perspective view of the basic components making up the spring clamp tool of the present invention;

FIG. 3 is an elevational view partly in cross section showing the manner in which the clamp tool is positioned on the casing preparatory to removing the shock absorber for servicing;

FIG. 4 is a view similar to FIG. 3 illustrating the positioning of various components during a removal operation; and, FIG. 5 is a view similar to FIGS. 3 and 4 illustrating the complete removal of the shock absorber.

DETAILED DESCRIPTION OF THE PREFERRED EMBODIMENT

Referring first to FIG. 1 there is shown an automobile 10 provided with a conventional shock absorber 11 surrounded by a coiled spring 12. The coiled spring 12 normally extends between a casing 13 secured at its lower end to the ball joint 14. The upper end of the coiled spring 12 extends to an upper frame portion 15 of the vehicle.

In the normal servicing of shock absorbers, it is necessary to jack up the automobile and remove the tire 16 shown in FIG. 1 as well as certain portions of the disc brake assembly 17. The coiled spring 12 and casing 13 as well as various further components are then removed from the vehicle to workbench site wherein a special tool is provided to retract the coiled spring 12 and permit removal of the shock absorber 11. As stated, this procedure is expensive and time consuming.

Referring now to FIG. 2, there is shown the specially designed spring clamp tool in accord with the present invention which permits removal of the shock absorber itself from under the vehicle without having to remove other components.

As shown in FIG. 2, the tool includes first and second clamp members 18 and 19 each in the form of a bar shaped to define a central semi-circular portion such as indicated at 20 for the bar 18 and outer smaller semi-circular portions on either side of the central portion such as indicated at 21 and 22 for the bar 18. Correspondingly shaped portions are shown at 23, 24 and 25 for the bar 19.

The first and second bars 18 and 19 are arranged to be clamped in opposing relationship as by bolts 26 and 27 and cooperating nuts 28 and 29. When the bars are secured together in opposed relationship, the central portions define a large central opening and the outer smaller semi-circular portions define smaller openings on either side of the central opening.

First and second rods 30 and 31 are arranged to extend upwardly through the defined outer openings, these rods terminating in hooks 32 and 33 respectively. The lower ends of the rods include threaded portions 34 and 35 for receiving tightening nuts 36 and 37. Suitable washers 36' and 37' cooperating with the nuts 36 and 37 may be provided as shown.

Referring now to FIGS. 3, 4 and 5, the manner in which the spring clamp tool is utilized to permit removal of a shock absorber from the vehicle will be understood.

Referring first to FIG. 3, the clamp is shown secured about the casing 13. The shock absorber 11 itself has a shaft portion 38 within the coiled spring 12 which extends up through a securing plate 39 positioned under the upper frame portion 15 of the vehicle. The securing plate 39 is secured to the underside of the vehicle frame 15 as by nuts 40 and 41. A shock absorber shaft nut 42 threads on the upper threaded end of the shock absorber shaft 38 so that it is secured to the frame 15. An upper spring cup 43 is engaged by the upper portion of the coiled spring 12 and this cup 43 is spaced from the securing plate 39 by a bearing 44.

The lower portion of the cylinder portion of the shock absorber within which the shock absorber shaft 38 extends is indicated in dotted lines at 45 within the casing 13. As shown, the upper end of the cylindrical portion 45 includes a small threaded collar 46 for securing the cylindrical portion 45 to the upper end of the casing 13. This securement is adjacent to a cup 47 engaging the lower portion of the coiled spring 12.

With the clamp members described in FIG. 2 secured about the casing 13 as shown, the rods 30 and 31 may have their hook portions 32 and 33 secured over diametrically opposite sides of the coiled spring 12, these rods extending up exteriorly of the coiled spring.

By now threading on the tightening nuts 36 and 37 the rods 30 and 31 are pulled through the outer openings defined by the clamp thereby retracting the coiled spring 12 as indicated in FIG. 4.

In an actual operation, the coiled spring 12 is first retracted and then the upper nuts 40 and 41 along with the shock absorber shaft nut 42 are removed. It is then possible to simply telescope in the shock absorber shaft 38 into the cylinder 45 within the casing 13 to drop down the upper assembly securing plate 39, associated bearing 44 and upper spring cup 43. This lower position of the latter elements is illustrated in FIG. 4.

After the upper portion of the shock absorber shaft has been freed from the car frame 15, the assembly may be swung away from under the frame 15 about the ball joint 14 and the coupling members and shock absorber itself removed.

The foregoing operation is schematically illustrated in FIG. 5 wherein it will be noted that the securing plate 39, bearing 44 and upper spring cup 43 are separated from the shock absorber shaft 38 while the shock absorber shaft 38 and cooperating cylinder 45 have been lifted from within the casing and coiled spring. With respect to this latter separation, it will be noted that the threaded collar 46 has been unthreaded from mating annular threads 48 on the upper portion of the casing 13 as shown in FIG. 5.

After the shock absorber has been serviced or after a new one has been substituted therefor, the procedure in re-inserting the shock absorber is the same as described with respect to its removal. Thus, the new or serviced shock absorber is positioned within the casing 13 and the threaded collar 46 secured to the threads 48 to hold the cylindrical portion of the shock absorber in place. The upper assembly including the upper cup for the spring 43, bearing 44 and plate 39 are then positioned over the shaft 38 and the shaft 38 telescoped from the cylinder of the shock absorber upwardly after swinging the assembly beneath the frame 15 so that the nuts 40 and 41 and shaft nut 42 may be secured as described in conjunction with FIGS. 3 and 4.

After the assembly is complete, the tightening nuts 36 and 37 on the spring clamp tool can be unthreaded to permit expansion of the coil spring 12 and thereafter the rods 30 and 31 unhooked from the spring and the clamp removed.

From the foregoing description, it will thus be seen that the present invention has provided a very advantageous clamp tool enabling easy servicing or replacement automobile shock absorbers which wholly avoids the necessity of disassembling various components heretofore required in the servicing of shock absorbers.

What is claimed is:

1. A spring clamp tool for servicing shock absorbers wherein the shock absorber is surrounded by a coiled spring extending between a lower casing and upper frame portion on a vehicle, said clamp tool including:
   a. first and second clamp members each in the form of a bar shaped to define a central semi-circular portion and outer smaller semi-circular portions on either side of the central portion;
   b. bolt and nut means for securing the bars together in opposed relationship with the central portions positioned about said casing so that said members are clamped to the casing, the outer smaller semi-circular portions defining openings on either side of the casing;
   c. first and second elongated rods passing through said openings on either side of said casing to extend upwardly exterior of the coiled spring, the upper ends of the rods terminating in hooks for engaging the spring at diametrically opposite sides, the lower portions of the rods extending through the openings being threaded; and,
   d. nuts threaded on the lower ends of the rods such that tightening of the nuts pulls the rods through the openings to retract the coiled spring whereby said shock absorber may be uncoupled from said upper portion and from said casing for removal and replacements without having to disassemble said casing and spring from said vehicle.

* * * * *